H. METCALFE & F. CHILLINGWORTH.
Spade-Bayonets.
No. 151,238. Patented May 26, 1874.
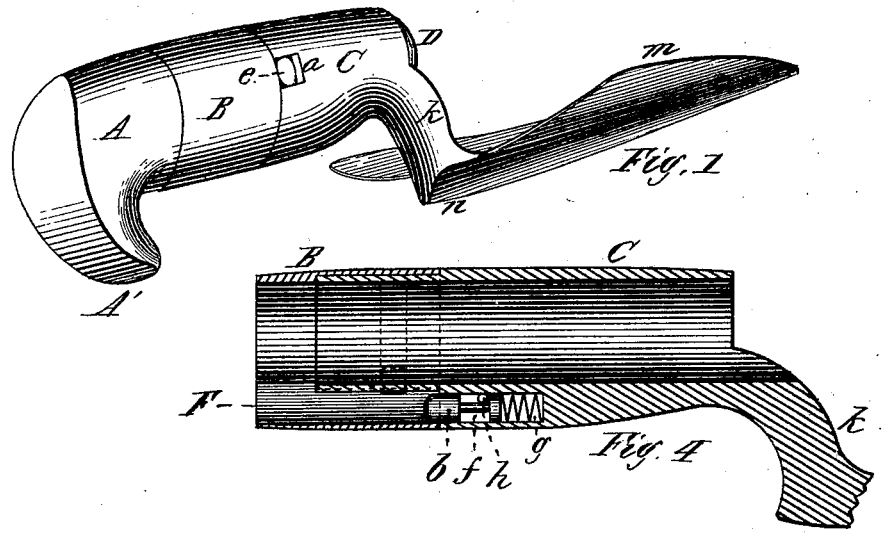
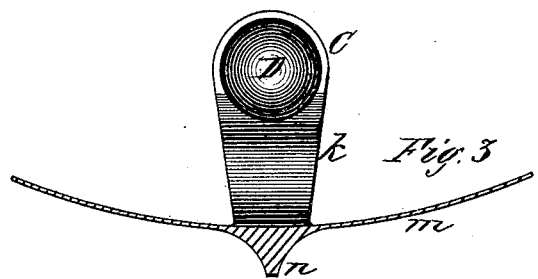
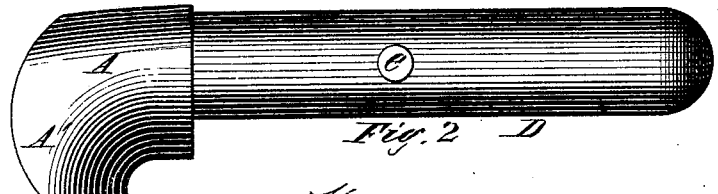
Witnesses
C. E. Buckland
J. P. Wall
Henry Metcalfe,
Felix Chillingworth, Inventor,
By J. A. Curtis,
their Atty.

UNITED STATES PATENT OFFICE.

HENRY METCALFE, OF UNITED STATES ARMY, AND FELIX CHILLINGWORTH, OF SPRINGFIELD, MASSACHUSETTS; SAID METCALFE ASSIGNOR TO SAID CHILLINGWORTH.

IMPROVEMENT IN SPADE-BAYONETS.

Specification forming part of Letters Patent No. 151,238, dated May 26, 1874; application filed February 11, 1874.

*To all whom it may concern:*

Be it known that we, HENRY METCALFE, Lieutenant in the United States Army, and FELIX CHILLINGWORTH, of the city of Springfield, State of Massachusetts, have invented a new and useful Improvement in Spade-Bayonets and attachments; and we do hereby declare that the following is a full, clear, and exact description thereof, reference being had to the accompanying drawings, making a part of this specification, and to the letters of reference marked thereon, in which—

Figure 1 is a perspective view of our invention. Fig. 2 is a side view of the socket-plug. Fig. 3 is a transverse section of the blade; and Fig. 4 is a longitudinal section of the bayonet-socket through the sight-groove of the sleeve and the spring-catch socket.

Our invention relates to what is known as the spade-bayonet, used for intrenching purposes when detached from the gun; and it consists, first, of a plug, arranged to be secured within the bayonet-socket, when the latter is detached from the gun-barrel, in substantially the same manner as the gun-barrel is secured within the socket; its object being to make a more symmetrical handle, which shall be better adapted to grasp with the hand when used for intrenching purposes, and also to prevent dirt and grit from entering the socket and becoming attached to the interior thereof, and injuring both the socket and the gun-barrel when attached to the latter; and our invention consists, second, of the blade, rib, and shank of a spade-bayonet, forged in a solid piece of metal, without any welding or seam, by which the bayonet is less expensive to manufacture, and is rendered very much stronger.

In the drawings, C represents the socket, and B the sleeve, of a spade-bayonet, as constructed and arranged according to the description contained in the patent granted to FELIX CHILLINGWORTH, April 16, 1872; but, instead of the friction-pin or spring-catch shown in said patent, we substitute the catch shown in Fig. 4, in which $b$ is the pin or catch, having a groove or channel therein, as shown at $f$, which, as shown in the drawing, practically reduces the size of the pin or catch for some distance along its length; and a pin, $h$, is secured in the socket, extending through the channel or recess $f$, so that the catch $b$ may have a movement to and fro longitudinally, but which movement is limited, each way, by the stop-pin $h$. To secure the catch $b$ in place, the spring $g$ is first placed in the socket, and the catch $b$ is then inserted, and a stop-pin, $h$, is then secured in a hole made in the socket transversely to the catch $b$, said pin extending through the channel $f$ of the catch, and in such position that the shoulder of one end of the channel $f$ strikes or bears against the stop-pin $h$ when the rounded end of the catch protrudes a little distance into the sight-groove F of the sleeve B, as shown clearly in Fig. 4. The plug A is provided with a cylindrical part, D, which is made to fit snugly the cylindrical bore of the socket C of the bayonet; and the plug may be provided with a somewhat enlarged and curved head, A', having a shoulder, H, and the cylindrical part D of the plug is of such length that the end of the sleeve bears against the shoulder H, while the end of the plug protrudes through the socket. The plug has a projection, $e$, thereon; and, if the sleeve B is turned so that the sight slot or groove F is in line with the opening $a$, the part D may be inserted into the socket, the projection $e$ passing along the sight slot or groove F into the opening $a$, and the sleeve being then turned back so that the end of the catch enters the groove F. The plug is then firmly secured in the socket of the bayonet. The shank $k$ and blade $m$ of the bayonet are forged in one solid piece with the rib $n$, and are not forged separately and then welded or riveted together, as is ordinarily done.

Heretofore the spade-bayonets which have been made have been manufactured with the blade made of one piece of metal, and the rib and shank of another, and these were then welded or riveted together; but there is great disadvantage in such construction, as the blade is very much weakened at the seam where the weld is made, and the cost of manufacture is considerably increased. By forging the blade, shank, and rib all in one piece, no seam is made and left to eventually work open, and thereby weaken the blade, but the whole is made to be of one homogeneous mass of metal.

It is obvious that the rib may be rolled down, and merged into the blade; or that the blade may be thickened in the middle, and the rib, as such, obliterated, and substantially the same thing or article before described will be produced.

In the arrangement of the spring-catch b, with its stop-pin h, it is evident that the catch may have a longitudinal slot or channel therein; and the end of the stop-pin project into said channel, the pin being made in the form of a screw, and turned into a threaded hole made in the socket; but we prefer to arrange both the catch and stop-pin as hereinbefore described, as, if the pin h becomes lost out, a soldier in the field might easily replace it, which he could not so easily do if made in the form of a screw.

Having thus described our invention, what we claim as new is—

1. A plug, A, arranged to be used in connection with, and secured within, a bayonet-socket, substantially as and for the purpose described.

2. A spade-bayonet, in which the shank, rib, and blade are made in one solid piece of metal, without weld or seam, substantially as described.

HENRY METCALFE,
*Lieut. Ordnance, U. S. A.*
F. CHILLINGWORTH.

Witnesses:
T. A. CURTIS,
JNO. D. PATTEN.